UNITED STATES PATENT OFFICE.

LEO E. BOWKER AND DANIEL F. BOWKER, OF KEENE, NEW HAMPSHIRE.

COMPOSITION FOR COATING THE INSIDE OF VESSELS FOR HOLDING OIL, &c.

SPECIFICATION forming part of Letters Patent No. 336,085, dated February 16, 1886.

Application filed November 18, 1885. Serial No. 183,253. (No specimens.)

*To all whom it may concern:*

Be it known that we, LEO E. BOWKER and DANIEL F. BOWKER, citizens of the United States, residing at Keene, in the county of Cheshire and State of New Hampshire, have invented certain new and useful Improvements in Composition for Coating the Inside of Vessels for Holding Oil, &c., of which the following is a specification.

The object of our invention is to produce a composition of matter for lining or coating the inside of barrels, cans, or packages made of wood, paper, or metal, so as to render the same impervious to the action of oils, paint, water, and all acids contained in articles of food.

The ingredients used in our process of coating vessels are frozen glue, pure water, diluted potash, raw linseed-oil, gum-copal, and alcohol, and they are employed in the proportion and manner hereinafter described.

To carry our invention into effect, we first take four pounds of frozen glue and add to it one gallon of pure water. It is then slowly heated until the glue is thoroughly melted. We then prepare a solution of potash by dissolving one pound of common potash in two quarts of water. Then to one pint of this potash solution we thoroughly mix one quart of raw linseed-oil. This compound of potash and linseed-oil is then poured into the dissolved glue while boiling hot, and the whole is stirred together and kept boiling at a temperature of about 200° Fahrenheit for from two to three hours, until the mixture is comparatively clear or translucent. This compound is then ready for use for the first coating. It is then applied to the inside of the vessel to be coated, while hot, with a brush or otherwise. It is then allowed to dry preparatory to the application of a second coating, which is prepared as follows: We take four pounds of pulverized gum-copal, one gallon of alcohol, and one pint of raw linseed-oil, and place the same in an airtight metallic vessel or drum, fitted inside with floats, which are made to revolve in the fashion of an ordinary churn. The mass is thoroughly worked together for one hour, until the gum is cut by the alcohol, and the compound is thoroughly mixed and presents the appearance of varnish, when it is ready for use as a second coat. It is then applied over the first coat while cold, or slightly warm, in the same manner as the first coat, and this completes the process. The evaporation of the alcohol serves to extract the water from the glue, and this last coating dries in a short time. It presents a smooth semi-transparent surface resembling a thick coat of ordinary varnish.

The first coating above described renders all vessels impervious to oils, benzine, paints, and all greasy substances not containing water or certain acids, and for barrels used for transporting kerosene and other oils we find the first coating will generally resist their action. We find by experience, however, that by carelessness, or otherwise, water and sometimes other foreign matter is often found in tanks or barrels containing petroleum and other oils, and water even in the smallest quantity settles to the bottom of the vessel, and gradually dissolves the glue contained in the coating and renders the vessel leaky. The two coats combined will effectually resist the action of both oil and water, and other liquids or substances containing more or less water or acids, such as butter, lard, brine, vinegar, pickles, all kinds of jellies, or preserved fruits.

Another valuable feature in our invention is, that our coating, in the proportions used, contains nothing injurious to health, or nothing in the least offensive to the taste or smell, and none of the substances or articles of food above mentioned will dissolve or remove the coating from the vessel or package.

Having fully described our invention, we claim—

1. The process of rendering vessels or packages for holding oils, pickles, preserved fruits, jellies, and other kindred articles of food proof against the penetration or action of the same by applying to the inside of said veessls a coating consisting of a compound of glue, water, diluted potash, raw linseed-oil, gum-copal, and alcohol, prepared in the proportions and in the manner as set forth.

2. A vessel or package provided with an inside coating of glue, water, diluted potash, linseed-oil, gum-copal, and alcohol, when prepared in the proportions and manner set forth, for the purpose of rendering said vessel impervious to the action of oils, water, jellies, preserved fruits, and other kindred articles of food.

3. The process of preparing and applying a compound for lining the inside of vessels or packages, so as to render the same impervious to the action of oils, water, jellies, preserved fruits, and other kindred articles of food, which consists, first, in applying to the inside of said vessels or packages a compound consisting of glue, water, diluted potash, and linseed-oil, and, second, a compound consisting of gum-copal, alcohol, and linseed-oil, all prepared in the proportions and applied in the manner as set forth.

In testimony whereof we affix our signatures in presence of two witnesses.

LEO E. BOWKER.
    DANIEL F. BOWKER.

Witnesses:
 HIRAM BLAKE,
 ARTHUR E. BOWKER.